United States Patent
Dodds (12)

(10) Patent No.: US 6,259,836 B1
(45) Date of Patent: Jul. 10, 2001

(54) OPTICAL FREQUENCY SHIFTER AND TRANSMISSION SYSTEM

(75) Inventor: David E. Dodds, Saskatoon (CA)

(73) Assignee: Telecommunications Research Laboratories, Edmonton (CA)

( * ) Notice: Subject to any disclaimer, the term of this patent is extended or adjusted under 35 U.S.C. 154(b) by 0 days.

(21) Appl. No.: 09/079,133

(22) Filed: May 14, 1998

(51) Int. Cl.[7] .................................................. G02B 6/28
(52) U.S. Cl. ............................... 385/24; 385/3; 385/27; 359/127; 359/190; 359/326
(58) Field of Search ............................. 385/1–3, 24, 27, 385/39; 359/124, 127, 326, 190, 174, 175

(56) References Cited

U.S. PATENT DOCUMENTS

| | | |
|---|---|---|
| 4,729,620 | 3/1988 | Pavlath . |
| 4,832,437 | 5/1989 | Kim et al. . |
| 5,115,468 * | 5/1992 | Asahi et al. ............................ 381/31 |
| 5,274,487 | 12/1993 | Fujimoto et al. ..................... 359/117 |
| 5,301,058 * | 4/1994 | Olshansky ............................. 359/188 |
| 5,333,000 * | 7/1994 | Hietala et al. ........................ 342/368 |
| 5,608,826 | 3/1997 | Boord et al. ............................ 385/37 |
| 5,619,368 | 4/1997 | Swanson ............................... 359/326 |
| 5,703,706 * | 12/1997 | Eckstein et al. ...................... 359/125 |

(List continued on next page.)

FOREIGN PATENT DOCUMENTS

410004386A * 1/1998 (JP) .

OTHER PUBLICATIONS

K. Horikawa, "Self–Heterodyning Optical Waveguide Beam Forming and Steering Network Integrated on Lithium Niobate Substrate," IEEE Trans. on Microwave Theory and Techniques, vol. 43, No. 9, pp. 2395–2401, Sep. 1995.*

Wavelength Conversion up to 18 nm at 10Gb/s by Four–Wave Mixing in a Semiconductor Optical Amplifier, David F. Geraghty, Robert B. Lee, Kerry J. Vahala, Marc Verdiell, Mehrdad Ziari and Atul Mathur, IEEE Photonics Technology Letters, vol. 9, No. 4, Apr. 1997, 452–454.

All–Optical Wavelength Conversion in Optical Multicarrier Networks, Eugenio Iannone, Roberto Sabella, Luca de Stefano, and Fabio Valeri, IEEE Transactions on Communications, vol. 44, No. 6, Jun. 1996, 716–724.

Signal Quality and BER Performance Improvement by Wavelength Conversion with an Integrated Three–port Mach–Zehnder Interferometer, W. Idler, M. Schilling, K. Daub, D. Baums, U. Korner, E. Lach, G. Laube and K. Wunstel, IEE 1995 Electronics Letters Online No.: 19950340, Jan. 24, 1995, 2 pages.

(List continued on next page.)

*Primary Examiner*—Rodney Bovernick
*Assistant Examiner*—Michael J Stahl
(74) *Attorney, Agent, or Firm*—Christensen O'Connor Johnson Kindness PLLC

(57) ABSTRACT

An optical transmission system has an input light guide and N multipath modulators operated as frequency shifters connected in cascade to receive light from the input light guide and output light along N output light guides where N is 1 or more, wherein the light carried by each ith output light guide, where i=1, . . . , N, is shifted in frequency from light carried by the input light guide by $i\omega_m$, and where each set of multipath modulators contributes a frequency translation of $\omega_m$ and where the light from each output light guide is modulated and combined with all other modulated output light to form a multiwavelength transmission system. A receiver equipped with similar frequency shifters is configured to generate a number of optical reference signals of frequencies $\omega_0+i\omega_m$, each reference sign to be added as a separate portion of the received signal so as to perform self-homodyne detection of the information signal associated with each respective modulated frequency.

9 Claims, 5 Drawing Sheets

U.S. PATENT DOCUMENTS

| | | | |
|---|---|---|---|
| 5,717,795 | * 2/1998 | Sharma et al. | 385/24 |
| 5,739,935 | 4/1998 | Sabella | 359/128 |
| 5,745,273 | 4/1998 | Jopson | 359/181 |
| 6,141,141 | * 10/2000 | Wood | 359/326 |

OTHER PUBLICATIONS

All–Optical Mach–Zehnder Wavelength Converter with Monolithically Integrated DFB Probe Source, L.H. Spiekman, U. Koren, M.D. Chien, B.I. Miller, J.M. Wiesenfeld and J.S. Perino, IEEE Photonics Technology Letters, vol. 9, No. 10, Oct. 1997, 1349–1351.

Abstract of U.S. Patent 5,734,493, Jopson, Issued Mar. 31, 1998, 1 page.

Abstract of U.S. Patent 5,526,155, Knox et al, Issued Jun. 11, 1996, 2 pages.

Izutsu, M. et al., "Integrated Optical SSB Modulator/Frequency Shifter," *IEEE Journal of Quantum Electronics,* vol. QE 17, No. 11, pp. 2225–2227 (Nov. 1981).

* cited by examiner

OPTICAL FREQUENCY SHIFTER AND TRANSMISSION SYSTEM

FIELD OF THE INVENTION

This invention relates to optical frequency shifters and their applications.

BACKGROUND OF THE INVENTION

It is desirable to have exactly spaced carrier frequencies for optical transmission systems. This invention provides for such exactly spaced carrier frequencies. It is also desirable to frequency shift previously modulated optical signals for the purpose of switching and retransmission.

SUMMARY OF THE INVENTION

The first object is a frequency shifter. It is a second object of the invention to create optical carrier signals spread at intervals of exactly $\omega_m$ where $\omega_m$ is a microwave frequency in the order of 5–50 GHz.

According to an aspect of the invention, there is provided an optical transmission system, comprising an input light guide and N frequency shifters connected to receive light from the input light guide and output light along N output light guides where N is 1 or more, wherein the light carried by each ith output light guide, where i=1, ... , N, is translated in frequency from light entering the input light guide by $i\omega_m$, and where each frequency shifter contributes a frequency translation of $\omega_m$.

Each of the N output light guides may be equipped with a modulator to impress an information signal on each output light guide. When the modulated outputs, each of different wavelength, are combined, the result is a wavelength division multiplexed optical signal.

In a further aspect of the invention, the optical transmission system is equipped with a cascade of N frequency shifters at the receiver to generate frequencies $\omega_0 + i\omega_m$ which may be used for self-homodyne square law direct detection of the information signals.

In a further aspect of the invention, there is provided an optical frequency shifter for translating an input optical frequency by a given amount, which may be used for wavelength placement on outgoing fibers in an optical switch in a wavelength division multiplexing system.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which:

FIGS. 1B–D are phasor diagrams representing the manner of operation of the device of FIG. 1a;

DETAILED DESCRIPTION OF PREFERRED EMBODIMENTS

A Mach Zehnder modulator is a balanced bridge interferometer that allows amplitude modulation of the optical carrier. The Mach Zehnder modulator is known in the art in itself, and so only the characteristics important to the present invention are described here. The ideal modulator consists of an optical splitter coupled to two identical phase modulating waveguides forming the two arms of the modulator, which waveguides are in turn connected to an optical combiner. The refractive index of the waveguides is electronically modulated by application of a potential to electrodes either covering or adjacent to the waveguides. The basic input/output relation for the Mach Zehnder modulator is $$E_{out} = E_{in}/2[exp(-j\pi v_1(t)/V_\pi) + exp(-j\pi v_2(t)V_\pi + \phi_b)]$$

where $v_1(t)$ or $v_2(t)$ are the applied voltages.

Figure 1A:
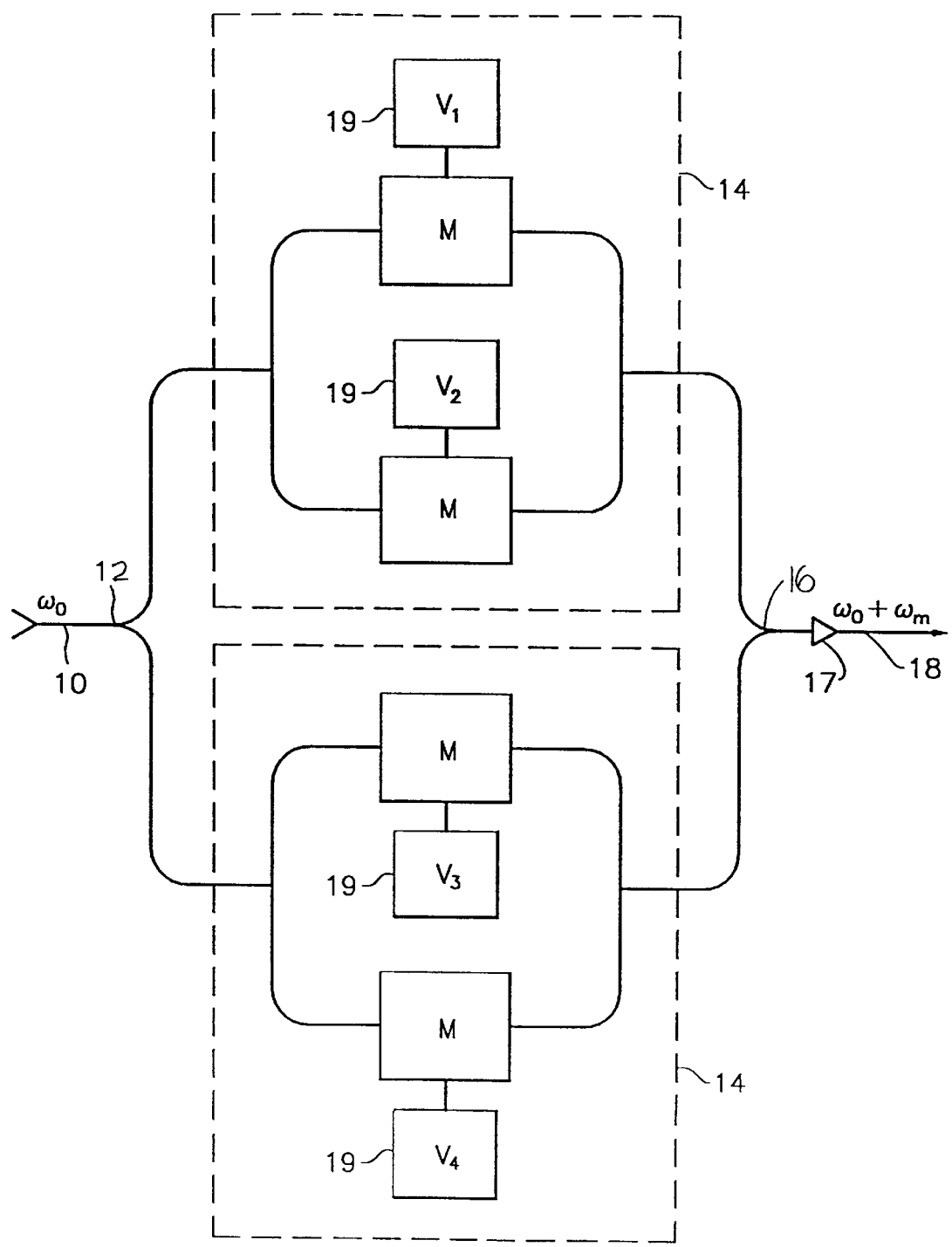
FIG. 1A is a schematic representation of a first embodiment of a frequency translator according to the invention.

Referring to FIG. 1A, there is shown an optical frequency translator which accepts as input light having a frequency $\omega_0$ and outputs light having a frequency $\omega_0 + \omega_m$. The optical frequency translator of FIG. 1a, has an input light guide 10, a two way splitter 12, and a set of two dual path Mach Zehnder (MZ) modulators 14 in parallel which are each connected to receive light from the input light guide 10 via the splitter 12. Light output from the two MZ modulators is combined through combiner 16 and output along output light guide 18. Each of the MZ modulators has an associated voltage source 19 which supplies a modulating voltage to each MZ modulator 14. The voltage sources 19 have output voltages characterized such that modulated light appearing on the output light guide 18 is translated in frequency by a frequency $\omega_m$ from light input to the input light guide 10. An amplifier 17 is provided on the output light guide 18 to compensate for $K_1$.

Figure 1B:
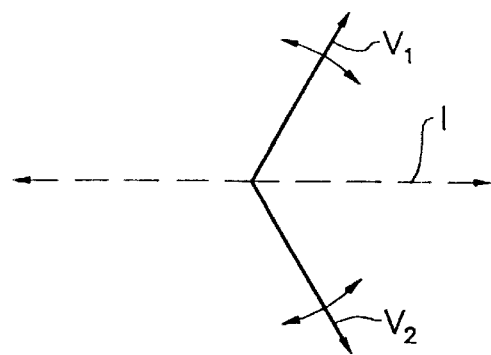
Figure 1C:
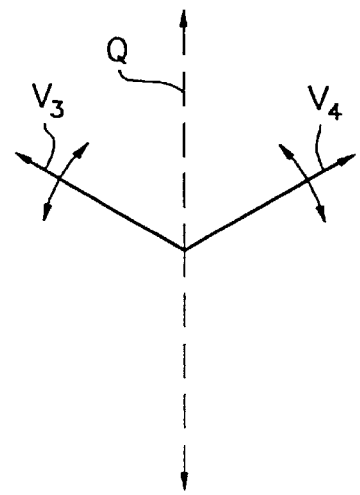
Figure 1D:
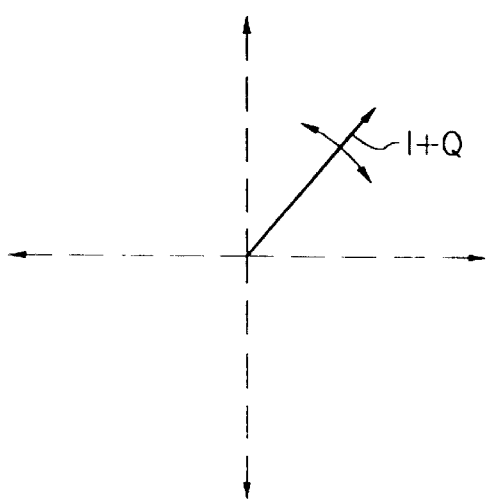

In the case of the four path structure of FIG. 1a, the voltages $V_1 - V_4$ may comprise the following voltages:

$V_1 = \epsilon + V\pi/2 \, (1 - K \cos \omega_m t)$ $V_2 = \epsilon - V\pi/2 \, (1 - K \cos \omega_m t)$ $V_3 = V\pi + V\pi/2 \, (-K \sin \omega_m t)$ $V_4 = -V\pi/2 \, (-K \sin \omega_m t)$ $V\pi$ is the voltage required at one electrode of the MZ to change the optical output from full intensity to extinction. $\epsilon$ is a small bias voltage used to adjust the delay between the upper and lower dual path MZ modulators. In the phasor diagrams, FIG. 1B–1D, the voltages $V_1 - V_4$ cause the phase of the light to vary according to the phasors indicated by the respective voltages. For the optical signal, the inphase optical component I (FIG. 1B) is driven by $\cos\omega_m t$ ($V_1$ and $V_2$) and the quadrature optical component Q is driven by $\sin\omega_m t$ ($V_3$ and $V_4$). The resultant sum I+Q is shown in FIG. 1D. This combination of voltages can be shown to produce an output optical frequency $\omega_0 + \omega_m$ at the output light guide 18 as follows:

For input optical electric field $$E \, in = \cos \omega_o t = Re\{e^{j\omega_o t}\}$$

and for small values of the modulation coefficient K the output electric field is given by the following where $K_1 = \pi K/2$ $E_{out} = K_1 \cos \omega_o t \cos \omega_m t + K_1 \sin \omega_o t \sin \omega_m t$ $= K_1 \cos \omega_o t (\cos \omega_m t + j \sin \omega_m t)$ $= K_1 Re[e^{j\omega_o t}] (\cos \omega_m t + j \sin \omega_m t)$ $= K_1 Re[e^{j\omega_o t} \cdot e^{j\omega_m t}]$ $= K_1 Re\{e^{j(\omega_o + \omega_m)t}\} = K_1 \cos(\omega_o + \omega_m) t$ The frequency shift can be $+\omega_m$ or $-\omega_m$ depending on the polarity of bias voltages or microwave voltages on the electrodes.

Figure 2:
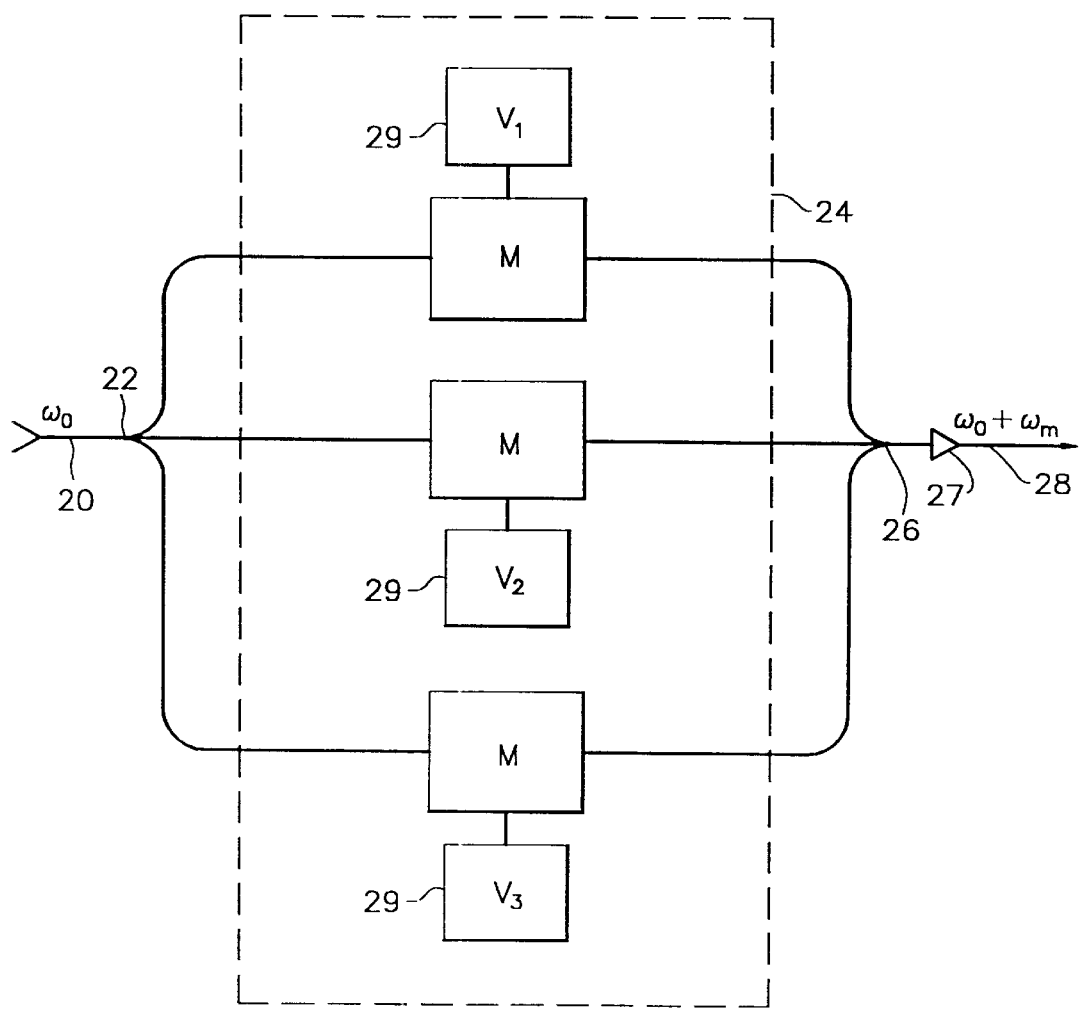
FIG. 2 is a schematic representation of a second embodiment of a frequency translator according to the invention.

An alternative structure is shown in FIG. 2, in which an optical frequency translator is formed with an input light guide 20, a three way splitter 22, and a three path modulator 24 in which each path is connected to receive light from the input light guide 20 via the splitter 22. Light output from the three path modulator 24 is combined through combiner 26 and output along output light guide 28. Each of the modulator paths has an associated voltage source 29 which supplies a modulating voltage to each modulator path. The voltage sources 29 have output voltages characterized such that modulated light appearing on the output light guide 28 is translated in frequency by a frequency $\omega_m$ from light input to the input light guide 20. An amplifier 27 is provided on the output light guide 18 to compensate for $K_2$. The device shown in FIGS. 1A and 2 is a frequency shifter (labelled FS in the drawings).

Figure 3:
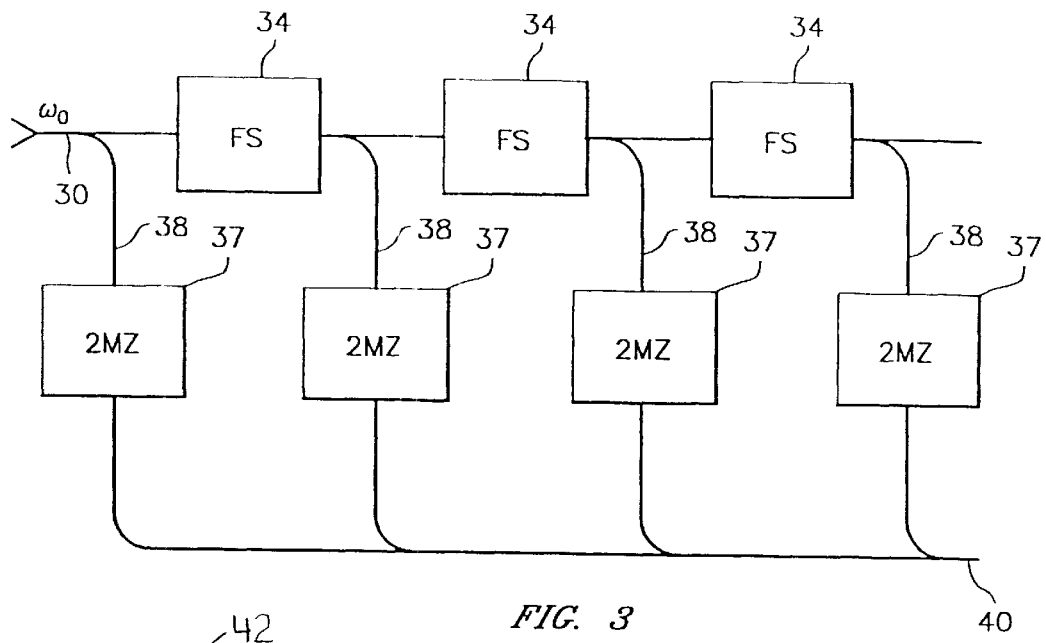
FIG. 3 is a schematic representation of first embodiment of a transmission system incorporating a frequency translator according to the invention.

A selection of the phases of the input voltages applied by the voltage sources 29 to the MZ modulations 24 that results in the desired frequency translations is shown in the following equation:

$E_o = Re\{e^{j\omega_o t}[K_2 \cos \omega_m t + K_2(-1/2 + j.866) \cos(\omega_m t + 2\pi/3) + K_2(-1/2 - j.866) \cos(\omega_m t + 4\pi/3)]\}$ Several sets of multiple path modulators FS configured as shown in either of FIGS. 1 or 2 may be combined to form an optical transmission system. Each multiple path modulator preferably applies the same frequency shift $\omega_m$, but it is possible to have different frequency shift in each succeeding modulator. The multiple path modulator can be termed as a frequency shifter. Such an optical transmission system is shown in FIG. 3 in which N frequency shifters 34 are connected to receive light from an input light guide 30 and output light along N output light guides 38. N may be 1 or more, but is preferably greater than 1. Each frequency shifter contributes a frequency translation of $\omega_m$. Thus, the light carried by each ith output light guide, where i=1, ..., N, is translated in frequency from light entering the input light guide by $i\omega_m$.

Figure 5:
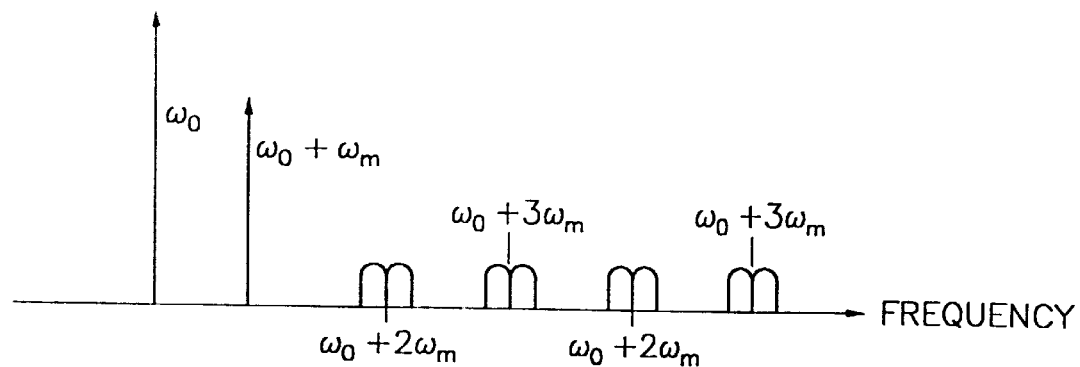
FIG. 5 is a chart showing the frequency content of the signal in the transmission path of FIGS. 3 and 4.

In the optical transmission system of FIG. 3, information may be carried by supplying dual arm MZ modulators 37 or other intensity and/or phase modulators on each output light guide 38. Each MZ modulator 37 is a conventional dual path MZ modulator for modulating an information signal $m_i(t)$ onto light carried by the output light guide. In this way, N information signals $m_i(t)$ where i=1, ..., N may be carried by the optical transmission system. The output from the MZ modulators 37 is combined for transmission along an optical fiber 40 for long distance transmission. The combined output spectrum is illustrated in FIG. 5.

Exactly spaced carrier frequencies have several advantages. In non-linear systems, the main intermodulation frequencies or beat frequencies due to carrier components fall exactly on adjacent carrier components and do not interfere with the modulation components. If narrow spacing is used and the number of optical carrier frequencies is large, the transmission resembles discrete multitone digital subscriber line transmission. An advantage is that dispersion compensation or equalization is not required up to 1000 km if each carrier handles only 2.4 Gb/s.

Figure 4:
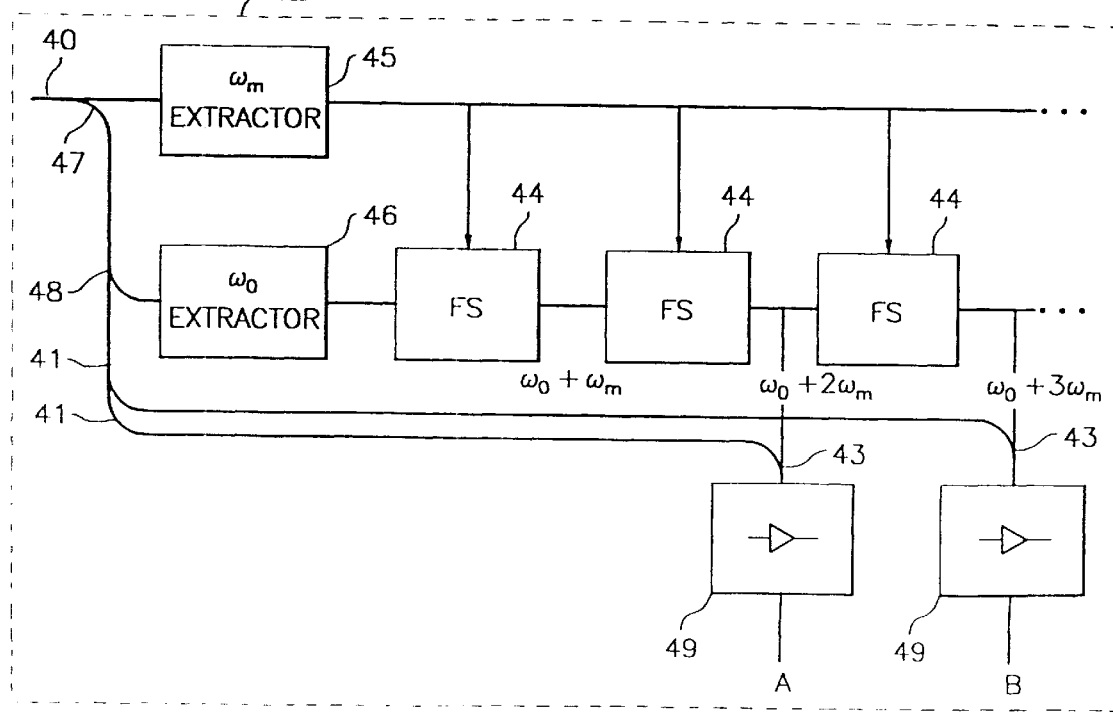
FIG. 4 is a schematic representation of receiver for use with the transmission system of FIG. 3.

Exactly spaced carrier frequencies allow for carrierless transmission if the receiver can determine the base optical frequency $\omega_0$ and the spacing $\omega_m$ between the carriers. As shown in FIG. 4, an optical receiver 42 at the end of the optical fiber 40 is conventionally connected to receiver light from the output light guides that has passed along the long distance transmission path 40. The optical receiver 42 may comprise N bandpass filters for isolating the sub-bands of information signals about each carrier frequency $\omega_0 + i\omega_m$, where i=1, ..., N and $\omega_0$ is the frequency of light carried by the input light guide. However, as shown in FIG. 4, it is preferred that the sub-bands (clearly illustrated in FIG. 5) may be translated to baseband through self-homodyne direct detection using an added optical carrier $\omega_0 + i\omega_m$ added at 43 and synthesized at the receiver using the base optical frequency $\omega_0$ plus some integer multiple of $\omega_m$. The synthesizer is composed of frequency extractors 45 and 46 and frequency shifters 44. The added carrier is synthesized by firstly detecting the optical carrier $\omega_0$ at extractor 46 connected by coupler (splitter) 48 to optical fiber 40 and detecting the carrier spacing $\omega_m$ in extractor 45 which is connected by splitter 47 to the optical fiber 40. Output from the extractor 45 is supplied as sin and cos control voltages with frequency $\omega_m$ to frequency shifters 44, which are each configured as shown in FIGS. 1A or FIG. 2. The output from extractor 46 is light with a frequency of $\omega_0$, and this is supplied to the series of frequency shifters 44 as an input in the same manner as the inputs for the frequency shifters shown in FIGS. 1A or 2. The output from each successive frequency shifter 44 is $\omega_0$ shifted by successive integer multiples of $\omega_m$. The output from each successive frequency shifter 44 is mixed with the signal from the optical fiber 40 at mixers 43, and then the information signals A, B etc are detected at detectors 49 by self-homodyne square law direct detection. The light from the optical fiber 40 is provided to the mixers 43 through splitters 41.

An advantage of reinserting carriers at the receiver is that the light level on the fiber can be considerably reduced, thus reducing non linear effects in transmission or allowing a higher transmission level which improves immunity to noise. Also the insertion at the receiver of large optical carrier at the desired channel frequency of each output eliminates the requirement for an optical filter to separate each output wavelength prior to detection (demodulation). This is especially useful in systems where the optical frequency spacing is very small and it is difficult to build stable narrowband optical filters.

This frequency shifter may also be used for wavelength placement on outgoing fibers in an optical switch in a WDM (wavelength division multiplexing) system. In this case, an optical carrier and all its associated modulation components can be shifted to a higher or lower wavelength.

Figure 6:
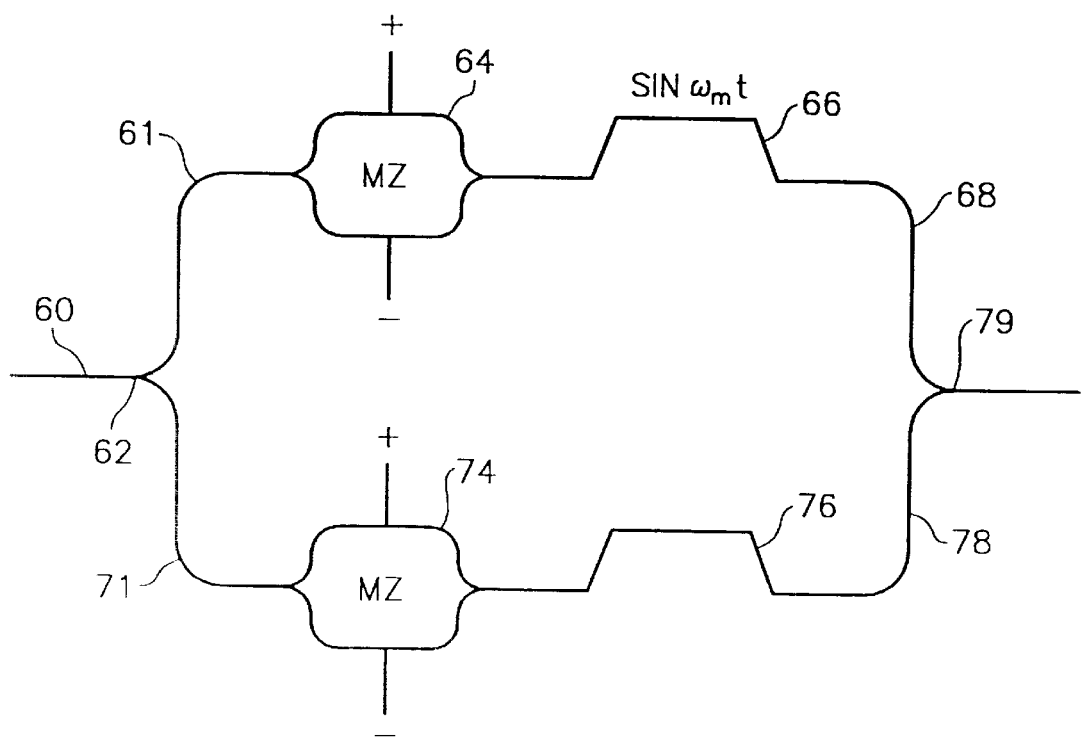
FIG. 6 is a schematic representation of a third embodiment of a frequency shifter according to the invention.

In an alternative configuration, frequency shifting may be obtained by first forming a carrier with an optical single sideband, as for example disclosed in R. Olshansky, "Single sideband optical modulator for lightwave systems," U.S. Pat. No. 5,301,058, 1994. The carrier is then cancelled through addition of unmodulated light at the frequency $\omega_0$. another method of forming an optical single sideband uses an amplitude MZ modulator followed by a phase modulator. A configuration of amplitude and phase modulator for use in the present invention is shown in FIG. 6. Light with frequency $\omega_0$ is input along fiber 60 to an upper path 61 through splitter 62. Upper path 61 has a conventional dual arm Mach Zehnder modulator 63, whose two arms have applied voltages ±cos$\omega_m$t, followed by a phase modulator 66 to which is applied voltage sin$\omega_m$t. With this configuration, light appears along the upper path at 68 as a single sideband signal having a frequency of $\omega_0+\omega_m$. The upper path also contains a component $\omega_0$, which requires cancellation as for example with the lower path 71 shown in FIG. 6. In this case, the light on the lower path 71 is provided to a dual arm Mach Zehnder 74 modulator to which is applied a suitable dc bias to adjust the amplitude of the light having frequency $\omega_0$ on path 71 so that it will match the amplitude of the light with frequency $\omega_0$ on path 61. Following the modulator 74 is a phase modulator 76 to which is applied a suitable voltage to phase shift the light on path 71 so that it cancels the component with frequency $\omega_0$ on path 61. The result is a single sideband signal with frequency $\omega_0+\omega_m$. A cascade of similar frequency shifters can also provide serial phase shifts to generate signals with frequency $\omega_0+i\omega_m$, where i is an integer.

Dual arm MZ modulators, amplitude modulators, phase modulators, splitters, combiners, optical fibers, detectors, extractors, voltage sources for MZ modulators are all well known in the art in themselves, and need not be further described. In cases where an optical fiber is described, it will be understood that any suitable light guide may be used, as for example a waveguide.

In the embodiments shown in FIGS. 1A and 2, it is believed that a modulator with a minimum of three paths is required in order to provide progressive phase changes to the phase change provided by the modulator. The number of paths may be five or more. While the preferred embodiment described uses the upper side band and generates optical frequencies $\omega_0+i\omega_m$, it is equally useful to use the lower sideband and generate optical frequencies $\omega_0-i\omega_m$.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. A multiple optical carrier generator comprising a cascaded chain of N optical frequency shifters, the chain of optical frequency shifters including a final optical frequency shifter, each optical frequency shifter comprising:
   an input light guide;
   a first set of modulators in parallel and each connected to receive light from the input light guide via a first splitter;
   an output light guide connected to receive light from the first set of modulators through an optical combiner, each output light guide other than the output light guide from the final optical frequency shifter forming an input light guide to a subsequent optical frequency shifter in the chain of optical frequency shifters;
   plural voltage sources, each modulator of the first set of modulators being connected to receive a modulating voltage from a respective one of the voltage sources;
   the voltage sources having output voltages characterized such that modulated light appearing on the output light guide of each optical frequency shifter is translated in frequency by a frequency $\omega_1$ from light input to the input light guide of the optical frequency shifter, whereby the chain of optical frequency shifters produces a set of N multiple optical carriers $\omega_0+i\omega_1$ where i=1 . . . N;
   and the multiple optical carrier generator further comprising:
   a respective one of a set of compensating amplifiers connected at the output of each optical frequency shifter so as to maintain a nearly constant amplitude of light in the chain of optical frequency shifters; and
   optical taps at each amplifier to provide an output of each optical carrier for use in transmitters and receivers of a wavelength division multiplexed optical communication system.

2. The multiple optical carrier generator of claim 1 in which each set of modulators is comprised of two Mach Zehnder modulators in parallel.

3. The multiple optical carrier generator of claim 1 in which each set of modulators comprises a modulator having three or more modulator paths in parallel.

4. The multiple optical carrier generator of claim 1 in which each set of modulators comprises:
   a first amplitude modulator and phase modulator in a first path for generating a single sideband signal including a carrier signal;
   a second path with modulators configured to generate a signal with equal amplitude and opposite phase to carrier signal appearing in the first path; and
   a combiner for combining signals on the first and second paths.

5. The multiple optical carrier generator of claim 1 further comprising:
   a second set of modulators, each modulator of the second set of modulators being connected to a corresponding one of the optical taps for modulating an information signal onto the light carried by each respective optical tap.

6. An optical transmission system comprising:
   (a) a transmitter incorporating a multiple optical carrier generator comprising a cascaded chain of N optical frequency shifters, the chain of optical frequency shifters including a final optical frequency shifter, each optical frequency shifter comprising:
   an input light guide;
   a first set of modulators in parallel and each connected to receive light from the input light guide via a first splitter;
   an output light guide connected to receive light from the first set of modulators through an optical combiner, each output light guide other than the output light guide from the final optical frequency shifter forming an input light guide to a subsequent optical frequency shifter in the chain of optical frequency shifters;
   plural voltage sources, each modulator of the first set of modulators being connected to receive a modulating voltage from a respective one of the voltage sources;
   the voltage sources having output voltages characterized such that modulated light appearing on the output light guide of each optical frequency shifter is translated in frequency by a frequency $\omega_1$ from light input to the input light guide of the optical frequency shifter, whereby the chain of optical frequency shifters produces a set of N multiple optical carriers $\omega_0+i\omega_1$ where i=1 . . . N;
   and the multiple optical carrier generator further comprising:
   a respective one of a set of compensating amplifiers connected at the output of each optical frequency shifter so as to maintain a nearly constant amplitude of light in the chain of optical frequency shifters;
   optical taps at each amplifier to provide an output of each optical carrier for use in transmitters and receivers of a wavelength division multiplexed optical communication system; AND a second set of modulators, each modulator of the second set of modulators being connected to a corresponding one of the optical taps for modulating an information signal onto the light carried by each respective optical tap (b) a receiver connected to an optical fiber; and (c) a combiner in the transmitter, the combiner being connected to the optical fiber and to each optical tap, for combining modulated light from each optical tap to form multiple modulated optical carriers to be transmitted over the optical fiber to the receiver.

7. The optical transmission system of claim 6 in which the optical receiver comprises:

a synthesizer incorporating a multiple optical carrier generator for generating reference signals corresponding to the frequencies generated by the multiple optical carrier generator of the transmitter;

plural mixers connected to the synthesizer for adding the reference signals to light received from the transmitter via the optical fiber; and plural detectors, each of the plural detectors being connected at the output of a respective mixer, for detecting information signals modulated onto a corresponding one of the multiple optical carriers.

8. The optical transmission system of claim 6 in which each modulator for modulating respective information signals onto the respective optical carrier signals is configured such that the modulated optical carrier signal contains sideband components and substantially no component at the frequency of the optical carrier.

9. The optical transmission system of claim 7 in which each modulator for modulating respective information signals onto the respective optical carrier signals is configured such that the modulated optical carrier signal contains sideband components and substantially no component at the frequency of the optical carrier.

* * * * *

UNITED STATES PATENT AND TRADEMARK OFFICE
CERTIFICATE OF CORRECTION

| | | |
|---|---|---|
| PATENT NO. | : 6,259,836 B1 | Page 1 of 1 |
| DATED | : July 10, 2001 | |
| INVENTOR(S) | : D.E. Dodds | |

It is certified that error appears in the above-identified patent and that said Letters Patent is hereby corrected as shown below:

<u>Title page,</u>
Item [57], ABSTRACT, "reference sign" should read -- reference signal --

Signed and Sealed this

Twelfth Day of March, 2002

Attest:

JAMES E. ROGAN
*Director of the United States Patent and Trademark Office*

*Attesting Officer*